United States Patent
Akaike et al.

(10) Patent No.: US 10,743,671 B2
(45) Date of Patent: Aug. 18, 2020

(54) AIR CONDITIONING SEAT

(71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/829,242

(22) Filed: Dec. 1, 2017

(65) Prior Publication Data

US 2018/0160816 A1 Jun. 14, 2018

(30) Foreign Application Priority Data

Dec. 8, 2016 (JP) .................................. 2016-238370

(51) Int. Cl.
| | |
|---|---|
| *A47C 7/74* | (2006.01) |
| *B60N 2/885* | (2018.01) |
| *B60N 2/90* | (2018.01) |
| *A47C 7/40* | (2006.01) |
| *B60N 2/70* | (2006.01) |
| *B60N 2/56* | (2006.01) |

(52) U.S. Cl.
CPC .................. *A47C 7/74* (2013.01); *A47C 7/40* (2013.01); *A47C 7/744* (2013.01); *B60N 2/5657* (2013.01); *B60N 2/5671* (2013.01); *B60N 2/70* (2013.01); *B60N 2/885* (2018.02); *B60N 2/986* (2018.02)

(58) Field of Classification Search
CPC .... A47C 7/74; A47C 7/00; A47C 7/40; B60N 2/56; B60N 2/986; B60N 2/70; B60N 2/5657; B60N 2/5671
USPC ................. 297/180.1, 180.13, 180.14, 217.1
See application file for complete search history.

(56) References Cited

U.S. PATENT DOCUMENTS

| | | | |
|---|---|---|---|
| 6,291,803 B1 * | 9/2001 | Fourrey | B60N 2/58 219/202 |
| 2009/0134677 A1 * | 5/2009 | Maly | B60N 2/5635 297/180.14 |

FOREIGN PATENT DOCUMENTS

JP  2006-102193  4/2006

* cited by examiner

*Primary Examiner* — Justin V Lewis
(74) *Attorney, Agent, or Firm* — Greenblum & Bernstein, P.L.C.

(57) ABSTRACT

An air conditioning seat including: two air outlets configured to distribute air distributed from an interior of the seat to an exterior of the seat, wherein the two air outlets are configured to receive supply of air from different air distribution paths and distribute air of different temperatures or humidity.

4 Claims, 4 Drawing Sheets

AIR CONDITIONING SEAT

CROSS-REFERENCE TO RELATED APPLICATIONS

This application claims priority from Japanese Patent Application No. 2016-238370 filed on Dec. 8, 2016, the entire contents of which are incorporated herein by reference.

TECHNICAL FIELD

The disclosure relates to an air conditioning seat, specifically to an air conditioning seat including two air outlets configured to distribute air distributed from an interior of the seat to an exterior of the seat.

BACKGROUND

There has been known a so-called air conditioning seat which has an air blowing function for improving comfort of a seated person by distributing air distributed from an interior of the seat from a seat surface (see JP-A-2006-102193). Specifically, there has been known an air conditioning seat in which a plurality of air outlets are provided on the seat surface, and the air is blown out from each of the air outlets towards the seated person.

In the above technology, since only the same type of air is blown out from any of the air outlets, it is not possible to distribute comfortable air which is different to each part of a body of the seated person.

SUMMARY

The disclosure enables to diversify the air distributed to the exterior of the seat.

According to an aspect of the disclosure, there is provided an air conditioning seat including: two air outlets configured to distribute air distributed from an interior of the seat to an exterior of the seat, wherein the two air outlets are configured to receive supply of air from different air distribution paths and distribute air of different temperatures or humidity.

DETAILED DESCRIPTION

Hereinafter, embodiments for carrying out the disclosure will be described with reference to the drawings.

Embodiment 1

Schematic Configuration of Air Conditioning Seat 1

Figure 1:
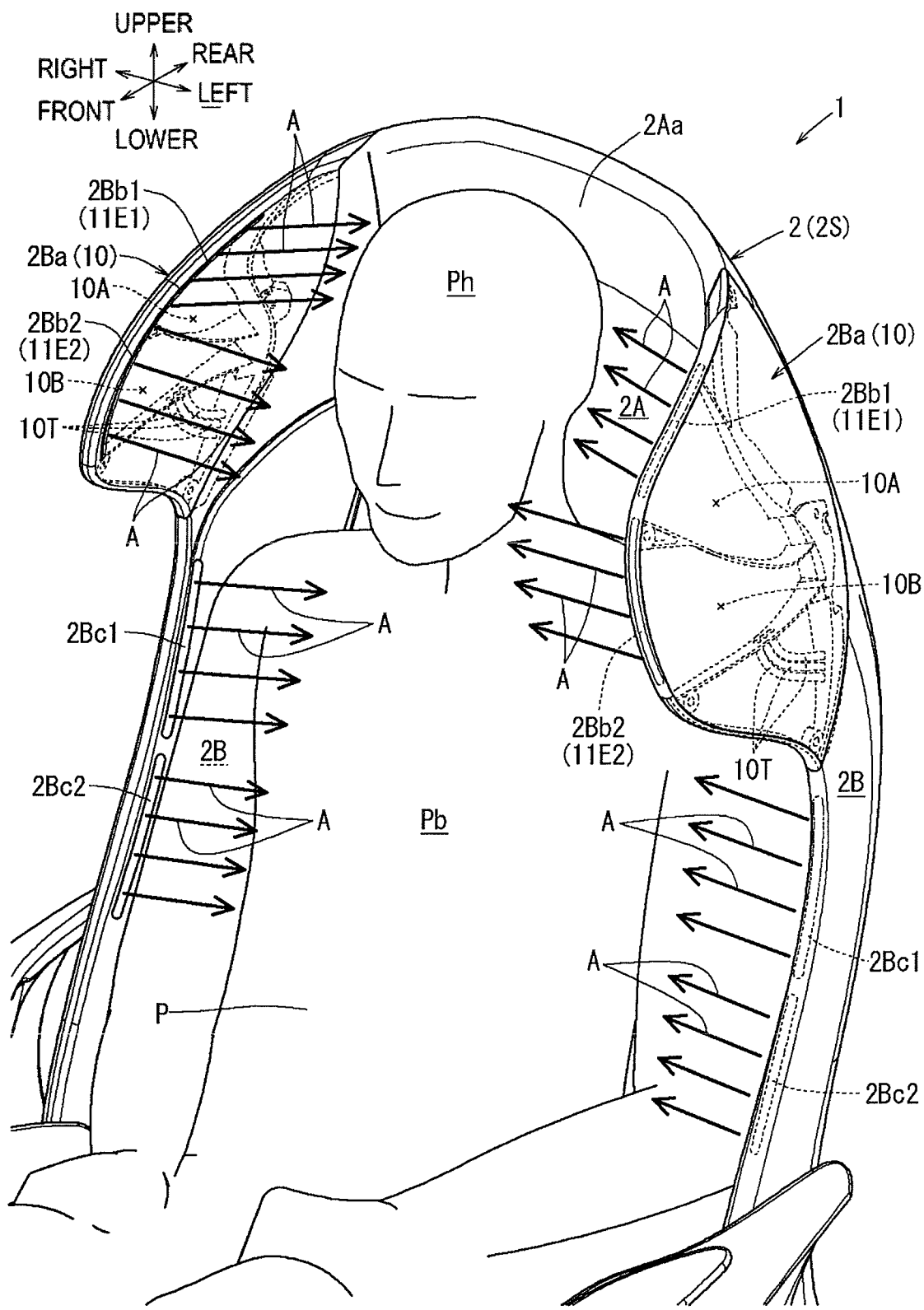
FIG. 1 is a perspective view showing a schematic configuration of an air conditioning seat according to a first embodiment.
Figure 2:
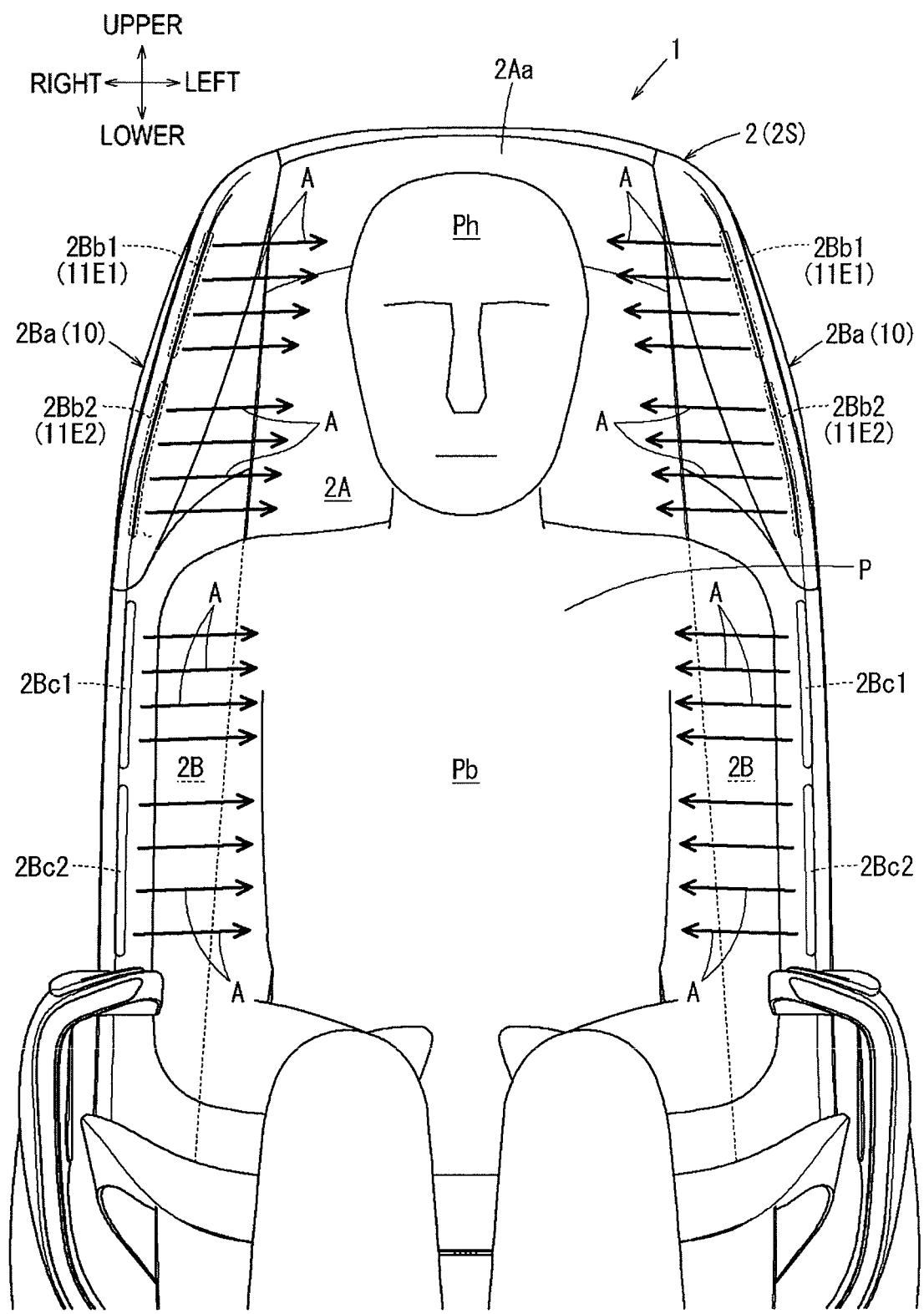
FIG. 2 is a front view of FIG. 1.
Figure 3:
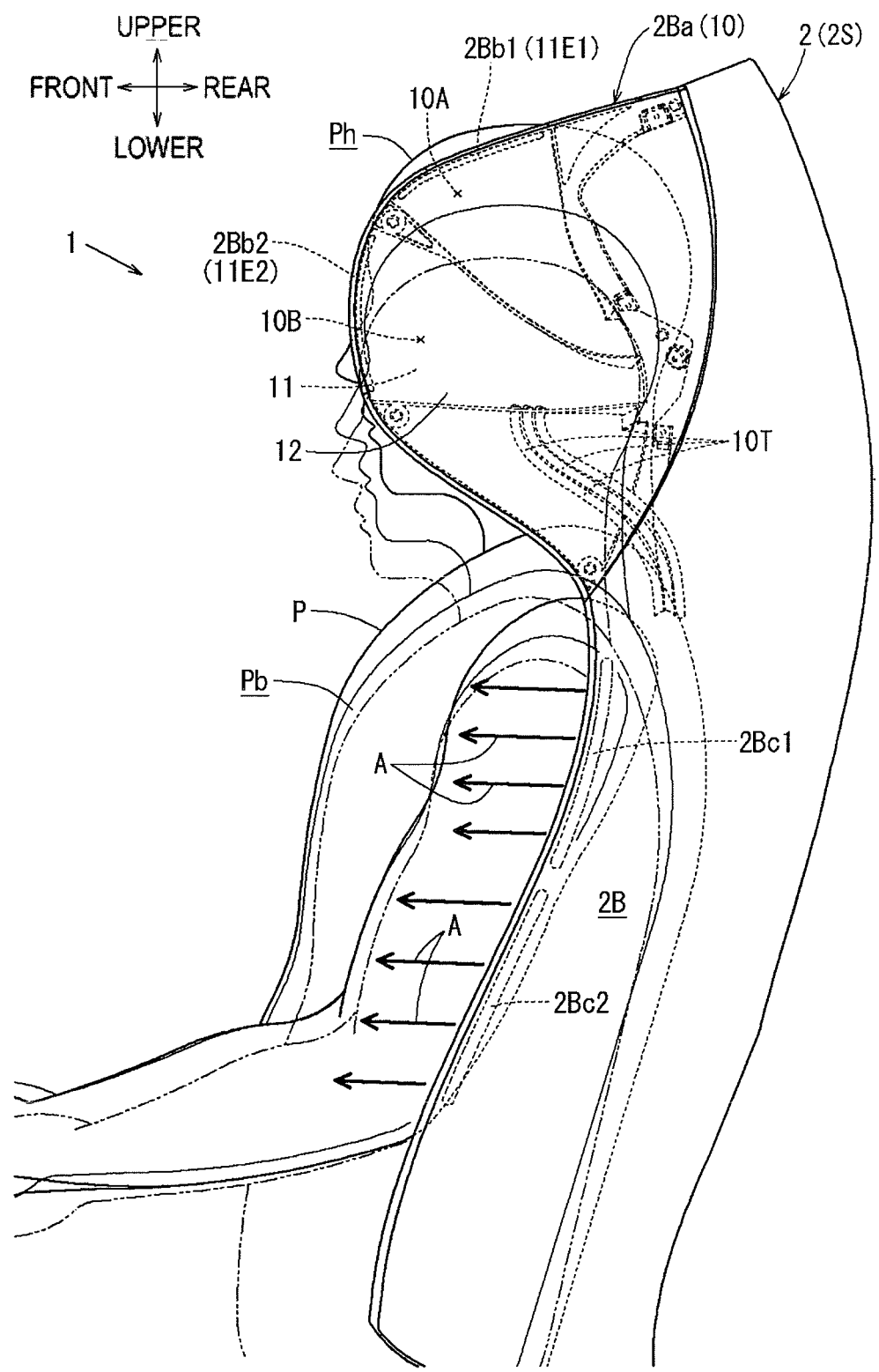
FIG. 3 is a side view of FIG. 1.

First, a configuration of an air conditioning seat 1 according to a first embodiment will be described with reference to FIGS. 1 to 4. Incidentally, in the following description, in a case of indicating directions such as front, rear, up, lower, left, right directions, and the like, the directions refer to those shown in the drawings. As shown in FIGS. 1 to 3, the air conditioning seat 1 of the present embodiment is configured as a rear side seat of an automobile. The air conditioning seat 1 is configured to include a seat back 2 which serves as a backrest portion for a seated person P, and a seat cushion (not shown) which serves as a seat portion.

The above-described seat back 2 is configured to include a shell structure 2S having a curved shape capable of supporting a body Pb of the seated person P from a rear side (back side) to left and right sides in a wrapping form. Specifically, the above-described shell structure 2S includes a top plate main portion 2A, which forms a central part of a front surface of the seat back 2 and supports the body Pb of the seated person P from the rear side, and top plate side portions 2B which form right and left side parts of the front surface of the seat back 2 and support the body Pb of the seated person P from left and right outer sides in a wrapping form (two lateral sides). The above-described seat back 2 is configured as a headrest portion 2Aa, so-called high-back type configuration, in which a head Ph of the seated person P can lean on an upper side area of the top plate main part 2A.

The above-described top plate side portions 2B on the left and right of the seat back 2 project from edge portions of left and right sides of the above-described top plate main portion 2A towards a front outer side thereof in a curved shape and cover the body Pb of the seated person P from the left and right sides in a wrapping form. Upper side areas of each of the above-described top plate side portions 2B is formed as a projecting portion 2Ba which project towards a front outer side further than a lower side area thereof and are capable of covering the head Ph of the seated person P from the left and right sides in a wrapping form.

Projecting portions 2Ba respectively project towards a front side thereof to a position where a front surface of the head Ph of the seated person P in a generally standard posture is aligned with the front surface of the projecting portions 2B. The heights of the projecting portions 2B is gradually rounded into a tapered shape towards a front outer side thereof (see FIG. 3). Due to the projecting of the projecting portions 2Ba, a good personal space capable of appropriately obstructing view from left and right sides thereof can be formed on left and right sides of the head Ph of the seated person P.

In the above-described projecting portions 2Ba, air outlets 2Bb1 and 2Bb2 which are opened in a slit shape are formed in peripheral parts of inner side surface portions of the projecting portions 2Ba which are arranged opposite to each other along the peripheral parts. Additionally, air outlets 2Bc1 and 2Bc2 which are opened in an elongated slit shape in the height direction are formed in peripheral parts which are at a lower side of the projecting portions 2Ba of the above-described top plate side portions 2B along the peripheral parts.

The above-described air outlets 2Bb1 and 2Bb2 formed along the peripheral parts of the projecting portions 2Ba are respectively formed at an upper edge part of the above-described projecting portion 2Ba (air outlets 2Bb1) which passes across, in a front-rear direction, vicinity of an upper surface of the head Ph of the seated person P, and a front edge part of the above-described projecting portion 2Ba (air outlets 2Bb2) which passes across, in a height direction, vicinity of the front surface of the head Ph of the seated person P. The air outlets 2Bb1 and 2Bb2 are respectively configured to have a function of blowing air A sent out from a blower (not shown) provided under the seat towards the head Ph of the seated person P in a lateral direction (left-right direction) through ducts 10A and 10B which are provided in the above-described projecting portions 2Ba. The details of the ducts 10A and a0B will be described later.

Specifically, as shown in FIG. 3, air outlets 2Bb1 formed in the upper edge parts of the above-described projecting portions 2Ba are generally disposed such that the air A can be blown towards the vicinity of the upper surface of the head Ph of the seated person P regardless of any physique of the seated person P from a relatively large physique (AM50) to a relatively small physique (AF05). Also, air outlets 2Bb2 formed in the front edge parts of the above-described projecting portions 2Ba are generally disposed such that the air A can be blown towards the vicinity of the front surface of the head Ph of the seated person P regardless of any physique of the seated person P from a relatively large physique (AM50) to a relatively small physique (AF05).

As shown in FIGS. 1 to 3, the above-described air outlets 2Bb1 and 2Bb2 are configured to be respectively connected to different blowers (not shown), and air A of different temperatures or humidity can be blown out from the air outlets 2Bb1 and 2Bb2. Specifically, for example, the temperature of the air A blown out from the air outlets 2Bb2 on a front edge side may be set to be higher than that of the air A blown out from the air outlets 2Bb1 on an upper edge side, or humidity of the air A blown out from the air outlets 2Bb2 on the front edge side may be set to be higher than that of the air A blown out from the air outlets 2Bb1 on the upper edge side.

With such an arrangement, in a case where a temperature inside a vehicle is relatively high, for example, in summer, it is possible to blow air A adjusted to a comfortable cold temperature to the vicinity of the upper surface of the head Ph of the seated person P, and meanwhile to blow air A at a suitable temperature which is not as cold as that in the vicinity of the upper surface of the head Ph and of moderate humidity at which it is not likely to be dry to the vicinity of the front surface of the head Ph of the seated person P, that is, to vicinity of a front surface of a face thereof. Similarly, in a case where a temperature inside a vehicle is relatively low such as in winter, it is possible to blow air A at appropriate temperatures to the vicinity of the front surface and to the vicinity of the upper surface of the head Ph of the seated person P, and meanwhile to blow air A of moderate humidity at which it is not likely to be dry to the vicinity of the front surface of the head Ph of the seated person P, that is, to the vicinity of the front surface of the face. Here, the air A blown out from each of the air outlets 2Bb1 and 2Bb2 may be set to the same temperature or humidity.

With such a configuration, it is possible to blow different comfortable air A at the same time to the head Ph of the seated person P according to parts to be applied. Also, ducts 10B leading to the air outlets 2Bb2 for blowing air A towards the vicinity of the front surface of the head Ph of the seated person P are connected to tubes 10T through which an aroma from an aroma device (not shown) can be added to the air A passing through the ducts 10B. With the above configuration, it is possible to distribute air A with a certain aroma having an effect of improving comfort such as a relaxing effect to the vicinity of the face of the seated person P, such that a more comfortable air A can be blown to the seated person P.

The air outlets 2Bc1 and 2Bc2 formed along the peripheral parts at an area lower than the projecting portions 2Ba of the top plate side portions 2B are respectively formed at the front edge parts of the top plate side portions 2B (air outlets 2Bc1) which pass across, in the height direction, vicinity of an upper half portion of the body Pb of the seated person P, and front edge parts of the top plate side portions 2B (air outlets 2Bc2) which pass across, in the height direction, vicinity of a lower half portion of the body Pb of the seated person P. The air outlets 2Bc1 and 2Bc2 are respectively configured to have a function of blowing air A sent out from a blower (not shown) provided under the seat towards the body Pb of the seated person P in the lateral direction (left-right direction) through ducts which are not shown.

Specifically, as shown in FIG. 3, the above-described air outlets 2Bc1 at an upper side are generally disposed such that the air A can be blown towards the vicinity of the upper half portion of the body Pb of the seated person P regardless of any physique of the seated person P from a relatively large physique (AM50) to a relatively small physique (AF05). Also, the above-described air outlets 2Bc2 formed at a lower side are generally disposed such that the air A can be blown to the vicinity of the lower half portion of the body Pb of the seated person P regardless of any physique of the seated person P from a relatively large physique (AM50) to a relatively small physique (AF05).

As shown in FIGS. 1 to 3, the above-described air outlets 2Bc1 and 2Bc2 are configured to be respectively connected to different blowers (not shown), and air A of different temperatures or humidity can be blown out from the air outlets 2Bc1 and 2Bc2. Specifically, for example, the temperature of the air A blown out from the air outlets 2Bc2 at the lower side may be set to be higher than that of the air A blown out from the air outlets 2Bb1. With such an arrangement, in the case where the temperature inside the vehicle is relatively high, for example, in summer, it is possible to blow air A adjusted to a comfortable cold temperature to the vicinity of the upper half portion of the body Pb of the seated person P, and meanwhile to blow air A at a suitable temperature which is not as cold as that in the vicinity of the upper half portion to the vicinity of the lower half portion of the body Pb of the seated person P, that is, to vicinity of a front surface of abdomen thereof. Similarly, in the case where the temperature inside the vehicle is relatively low such as in winter, it is possible to blow air A at appropriate temperatures to the vicinity of the upper half portion and to the vicinity of the lower half portion of the body Pb of the seated person P. Here, the air A blown out from each of the air outlets 2Bc1 and 2Bc2 may be set to be the same temperature or humidity.

Specific Configuration of Each Element

Hereinafter, a specific configuration of the shell structure 2S of the seat back 2 having the above-described air blowing function will be described in detail. As shown in FIGS. 1 to 3, the top plate main portion 2A and the top plate side portions 2B forming the shell structure 2S of the seat back 2 are configured to have the following basic structures. That is, the shell structure 2S is configured to have a metal frame serving as a strength member therein, the entire frame is covered by a pad made of urethane foam, and an entire outer surface of the pad is covered by a cover made of synthetic leather or fabric.

Figure 4:
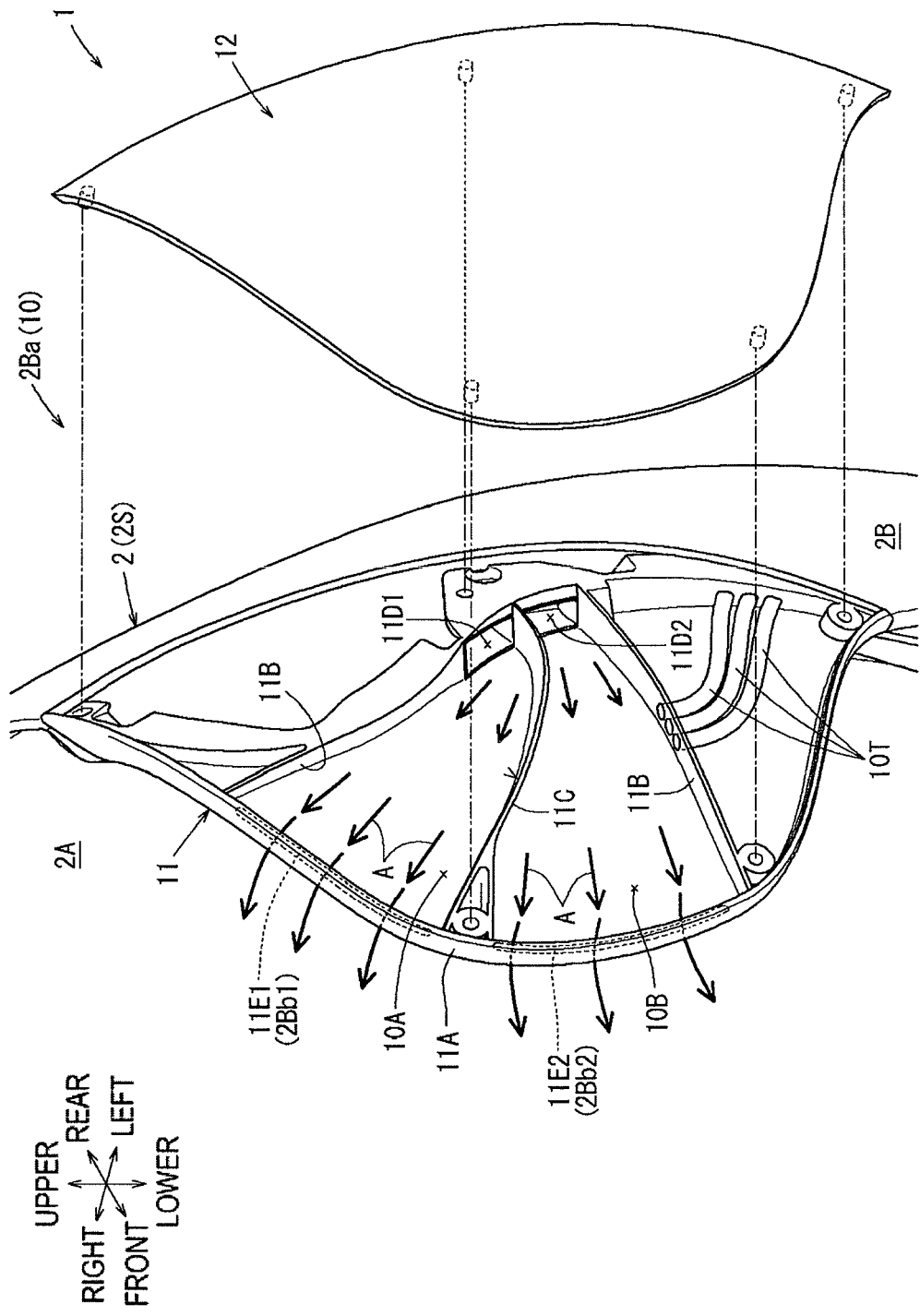
FIG. 4 is an exploded perspective view of main parts of FIG. 1.

However, in the shell structure 2S, only the above-described projecting portions 2Ba are configured by hollow shaped housing portions 10 made of acrylic resin. The housing portions 10 are respectively provided in a state of being fastened integrally and fixed to the frame (not shown) provided in the above-described top plate side portions 2B. Specifically, as shown in FIG. 4, each of the above-described housing portions 10 is formed into a thin hollow box shape by a main body plate 11 having a curved-plate shape and a cover plate 12 which is assembled in a form of covering a back side surface portion of the main body plate 11 and is integrated with the main body plate 11.

The housing portions 10 are respectively formed into a shape in which overlapped thickness of the main body plate 11 and the cover plate 12 gradually becomes thinner in a tapered shape towards an upward direction or a front direction in which the projecting portions 2Ba project. Specifically, since ribs 11A to 11C extending in a form of rising in a strip shape from positions on a back surface of the above-described main body plate 11 are formed into a shape in which heights thereof gradually decrease towards projecting directions of the projecting portions 2Ba, each of the housing portions 10 is formed into a shape in which the overlapped thickness of the main body plate 11 and the cover plate 12 which are fitted with each other through the ribs 11A to 11C gradually becomes thinner towards the projecting directions of the projecting portions 2Ba.

More specifically, the back surface of the above-described main body plate 11 is formed with a rib 11A extending in a form of rising continuously along a peripheral portion in a projecting direction of the main body plate 11, two ribs 11B extending in a form of rising radially from the back surface of the main body plate 11 into the projection direction thereof, and a rib 11C extending in a form of rising radially from the back surface of the main body plate 11 in the projecting direction so as to partition a space between the two ribs 11B. The above-described ribs 11A to 11C are configured to be set to a state of being in contact with the cover plate 12 without gaps when the cover plate 12 is fitted to the back side of the main body plate 11, so as to segment a gap between the cover plate 12 and the back surface of the main body plate 11.

With the above configuration, the ducts 10A and 10B are formed between the cover plate 12 and the back surface of the main body plate 11, which are surrounded by the rib 11A at the periphery portion and the two radially extending ribs 11B and partitioned into two substantially hollow closed spaces of fan shapes by the rib 11C running between the rib 11A and the ribs 11B. The above-described ducts 10A and 10B are configured to receive supply of air A sent from supply ports 11D1 and 11D2 formed in the ribs 11B which form wall portions on a center side of the fan shapes by the above-described blowers (not shown), and to distribute the received air A to an exterior from air outlets 11E1 and 11E2 which are formed so as to penetrate outer peripheral edges of the fan shapes of the main body plate 11. The above-described air outlets 2Bc1 and 2Bc2 are formed by the above-described air outlets 11E1 and 11E2.

Specifically, the above-described air outlets 11E1 and 11E2 are formed to extend in a form of penetrating in an elongated slit shape along peripheral portions of the ducts 10A and 10B. More specifically, the air outlet 11E1 of each of the ducts 10A partitioned on an upper side is formed to penetrate in the elongated slit shape extending in a front-rear direction along an upper edge portion of the projecting portions 2Ba. Also, the air outlet 11E2 of each of the ducts 10B partitioned on a front side is formed to penetrate in the elongated slit shape extending in the height direction along the rounded front edge portion of the projecting portions 2Ba.

More specifically, from center sides of the fan shapes towards outer peripheral sides thereof, each of the above-described ducts 10A and 10B is formed into a form in which a cross sectional thickness of an inner portion thereof is gradually narrowed into a tapered shape and meanwhile a cross sectional width thereof gradually widens in a widening divergent shape. With the above configuration, even if each of the ducts 10A and 10B has a shape of gradually becoming thinner towards a front end side of the projecting direction according to a shape of each of the projecting portions 2Ba, it is possible to send out a large volume of air towards the front end side without narrowing a cross sectional area therein.

Additionally, each of the air outlets 11E1 and 11E2 is formed into an elongated slit shape, which extends over substantially an entire area in the cross-sectional width direction at an outer peripheral portion on the front end side in the air distribution direction of each of the ducts 10A, 10B while leaving both end side areas between the ribs 11B and the rib 11C. However, each of the air outlets 11E1 and 11E2 is formed into a shape that is opened such that an opening area thereof is smaller than a cross-sectional area cut at any portion of each of the ducts 10A and 10B. With such a configuration, through each air outlet 11E1 and 11E2, it is possible to blow air A towards the head Ph of the seated person P by raising an air speed to be faster than an air speed of air A distributed inside each of the ducts 10A and 10B.

Therefore, as shown in FIG. 1, it is possible to blow the air A appropriately over a wide range in a front-rear direction to the vicinity of the upper surface of the head Ph of the seated person P through each of the above-described air outlets 11E1 on an upper side extending in the front-rear direction. Also, it is possible to blow the air A appropriately over a wide range in the height direction to the vicinity of the front surface of the head Ph of the seated person P through each of the above-described air outlets 11E2 on a front side extending in the height direction. In addition, each of the ribs 11A to 11C which partition the above-mentioned ducts 10A and 10B can function rationally as a reinforcing member for enhancing structural strength of the housing portion 10. The above-described tubes 10T for adding the aroma to the air A passing through the above-described ducts 10B are provided in a state of being passed through from the exterior to the ribs 11B partitioning the ducts 10B and being connected to space inside the ducts 10B.

Summary

To summarize the above, the air conditioning seat 1 of the embodiment has the following structure. That is, an air conditioning seat (air conditioning seat 1) includes two air outlets (air outlets 2Bb1 and 2Bb2) configured to distribute air (air A) distributed from an interior of the seat to an exterior of the seat, wherein the two air outlets (air outlets 2Bb1 and 2Bb2) are configured to receive supply of air (air A) from different air distribution paths (ducts 10A and 10B) and distribute air (air A) of different temperatures or humidity. In this way, since air (air A) of different types can be distributed from the two air outlets (air outlets 2Bb1 and 2Bb2), it is possible to diversify the air (air A) to be distributed to the exterior of the seat and to apply the air (air A) of different types to body parts of the seated person (seated person P).

Additionally, the air conditioning seat has a shell structure (shell structure 2S) configured to support a body (body Pb) of a seated person (seated person P) from a back side of the seated person (seated person P) to at least one lateral side of the seated person (seated person P) in a wrapping form. A part of the shell structure is formed by a housing portion (housing portion 10) having a hollow shape partitioned by a partition, and the distribution air paths (ducts 10A and 10B) which are configured to supply the different air (air A) to the two air outlets (air outlets 2Bb1 and 2Bb2) are formed by the housing portion (housing portions 10) including the partition. With such a configuration, it is possible to form rationally the air distribution paths (ducts 10A and 10B) capable of supplying the different air (air A) to the two air outlets (air outlets 2Bb1 and 2Bb2) by using the shell structure (shell structure 2S) of the air conditioning seat (air conditioning seat 1).

Additionally, one of the two air outlets (air outlets 2Bb1 and 2Bb2) is a face-oriented air outlet (air outlet 2Bb2) through which air (air A) is distributed towards a front area of a head (head Ph) of the seated person (seated person P) from a lateral direction, and another of the two air outlets (air outlets 2Bb1 and 2Bb2) is an upper-head-oriented air outlet (air outlet 2Bb1) through which air (air A) is distributed towards an upper area of the head (head Ph) of the seated person (seated person P) from the lateral direction. With such a configuration, since the air (air A) of different temperatures and humidity can be applied to the face and the head of the seated person (seated person P), it is possible to distribute comfortable air (air A) to both the face and head.

Additionally, the face-oriented air outlet (air outlet 2Bb2) has a slit shape which is elongated in a height direction and is located on a front side of the upper-head-oriented air outlet (air outlet 2Bb1), and the upper-head-oriented air outlet (air outlet 2Bb1) has a slit shape which is elongated in the front-rear direction and is located on an upper side of the face-oriented air outlet (air outlet 2Bb2). With such a configuration, the air (air A) of different temperatures and humidity can be applied appropriately to the face and the head of the seated person over a wide range, and it is also possible to distribute the air (air A) to both the face and the head in a state of being not likely to be mixed with each other.

Additionally, the two air outlets (air outlets 2Bb1 and 2Bb2) are configured to receive the supply of the air (air A) from different blowers.

Although the embodiments of the disclosure have been described using one embodiment, the disclosure can be implemented in various forms other than the above embodiment. For example, the air conditioning seat of the disclosure can also be widely applied to a seat used for various vehicles including an automobile or a train, an aircraft, a ship, and the like in addition to a seat used for a non-vehicle such as furniture. The air blowing function installed on the air conditioning seat may distribute air from any position of a seat structure such as a seat cushion, an ottoman, a headrest, an armrest, and the like, in addition to the seat back.

In addition, the air distribution paths to the air outlets may not be necessarily configured by an element configuring the shell-structure, and may be configured by a separate body. Shapes of the air distribution paths and the air outlets are not limited to specific shapes, and those having various shapes can be applied. When the air distribution paths are configured by the housing portion of the shell structure, the housing portion may be made of a resin material other than an acrylic resin, a metal material or the like.

The structure for distributing air of different temperatures or humidity to the two air outlets may be provided with a cooling-heating device having a function of cooling and heating air, at positions of each of the air distribution paths, in addition to the structure that sends different air from different blowers. The number of the air outlets is not limited to two, and may be three or more. That is, the air conditioning seat of the disclosure may be configured with three or more air outlets as long as the air conditioning seat is provided with two air outlets which are configured to receive supply of air from different air distribution paths and distribute different temperatures or humidity.

What is claimed is:

1. An air conditioning seat, comprising:
a seat having a seat back providing a back-rest portion for a seated person, the back-rest portion having a first lateral edge and a second lateral edge,
a first top plate side portion protruding forwardly from the first lateral edge in a protruding direction and a second top plate side portion protruding forwardly from the second lateral edge in the protruding direction, the protruding direction extending generally from a rear side to a front side of the seat,
two air outlets provided within each of a first projecting portion of the first top plate side portion and a second projecting portion of the second top plate side portion, the two air outlets being configured to distribute air distributed from an interior of the seat to an exterior of the seat,
wherein the two air outlets are configured to receive an air supply from different air distribution paths via a first duct and a second duct, and the two air outlets are configured to distribute the air supply at least at one of different temperatures and humidities,
wherein the seat has a shell structure configured to support a body of the seated person from a back side of the seated person to at least one lateral side of the seated person in a wrapping form, and
wherein a part of the shell structure is formed by a housing portion provided in each of the first projecting portion of the first top plate side portion and the second projecting portion of the second top plate side portion,
wherein the housing portion has a hollow shape,
wherein the hollow shape is partitioned by a rib so as to define the first duct and the second duct that are provided in each of the first projecting portion of the first top plate side portion and the second projecting portion of the second top plate side portion, and
wherein the air supply is configured to flow through each of the first duct and the second duct in the protruding direction and the air supply is configured to be distributed to the exterior of the seat through the two air outlets in a direction intersecting with the protruding direction.

2. The air conditioning seat according to claim 1,
wherein one of the two air outlets is a face-oriented air outlet through which air is distributed towards a front area of a head of the seated person from a lateral direction, and another of the two air outlets is an upper-head-oriented air outlet through which air is distributed towards an upper area of the head of the seated person from the lateral direction.

3. The air conditioning seat according to claim 2,
wherein the face-oriented air outlet has a slit shape which is elongated in a height direction and is located on a front side of the upper-head-oriented air outlet, and the upper-head-oriented air outlet has a slit shape which is elongated in a front-rear direction and is located on an upper side of the face-oriented air outlet.

4. The air conditioning seat according to claim 1,
wherein the two air outlets are configured to receive the air supply from different blowers.

* * * * *